March 15, 1932.　　　G. H. CLARK ET AL　　　1,849,175
WATER HEATER
Filed Feb. 23, 1928　　　2 Sheets-Sheet 1

Inventors
Gordon H. Clark
Warren F. Clark
Kirn Hudson Kent
Attorneys

March 15, 1932.  G. H. CLARK ET AL  1,849,175
WATER HEATER
Filed Feb. 23, 1928  2 Sheets-Sheet 2
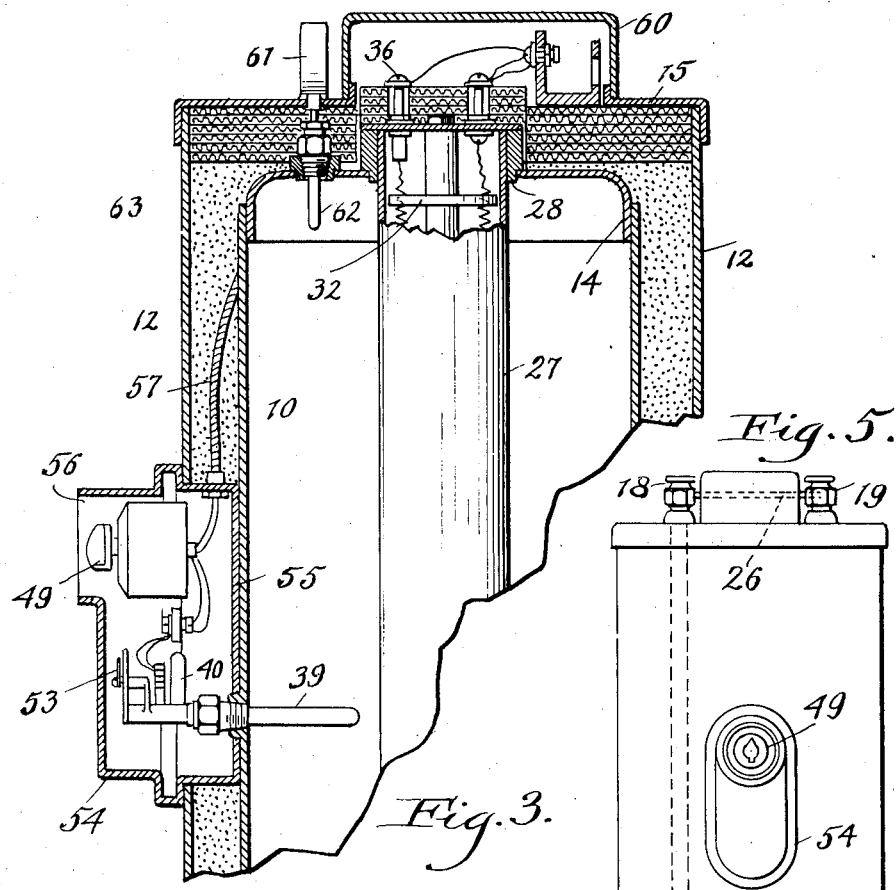
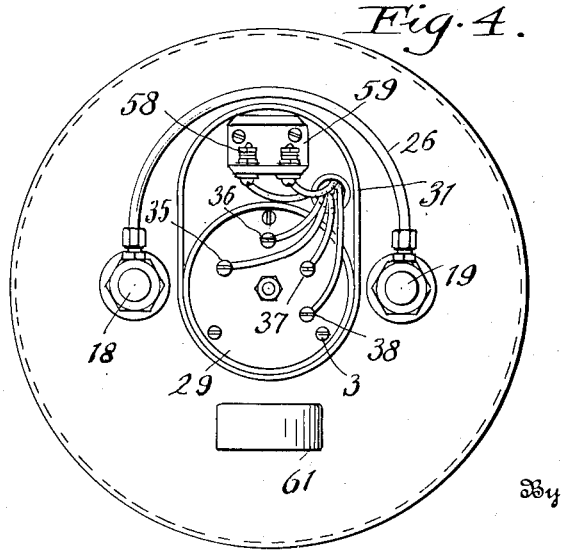
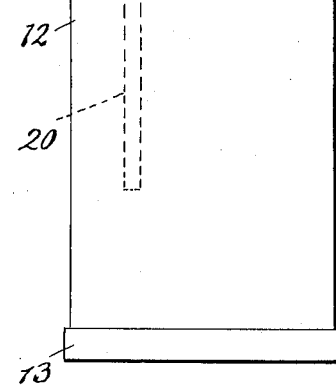
Inventors
Gordon H. Clark
Warren F. Clark
By Kwis Hudson & Kent
Attorneys Patented Mar. 15, 1932

1,849,175

UNITED STATES PATENT OFFICE

GORDON H. CLARK AND WARREN F. CLARK, OF PHILADELPHIA, PENNSYLVANIA, ASSIGNORS, TO AUTOMATIC ELECTRIC HEATER COMPANY, OF POTTSTOWN, PENNSYLVANIA, A CORPORATION OF DELAWARE

WATER HEATER

Application filed February 23, 1928. Serial No. 256,396.

This invention relates to electrical heating devices and more particularly to water heaters, whereby the water is adapted to be heated electrically to the desired temperature.

A primary object of the invention is to provide a device adapted for heating a quantity of water substantially uniformly throughout to any desired temperature and maintain the desired temperature of the water indefinitely.

A further object of the invention is to provide a heating device of the character referred to in which the temperature of the water is governed by a thermostatic device which can be predeterminately set for any desired temperature and when once set control automatically the uniform heating of the water.

A further object of the invention resides in the new and novel arrangement and construction of the heating unit for carrying out the purpose of the invention.

Another object of the invention is to provide a heating device which is simple in construction, inexpensive to manufacture and efficient in operation.

With the objects above indicated and other objects hereinafter explained in view, our invention consists in the construction and combination of elements hereinafter described and claimed.

Referring to the drawings—

Fig. 3 is a fragmentary vertical sectional view of the liquid heating device showing the control means for the heating unit.

Fig. 4 is a top plan view of the liquid heating device.

Fig. 5 is a front elevational view of the liquid heating device.

Figures 1, 2:
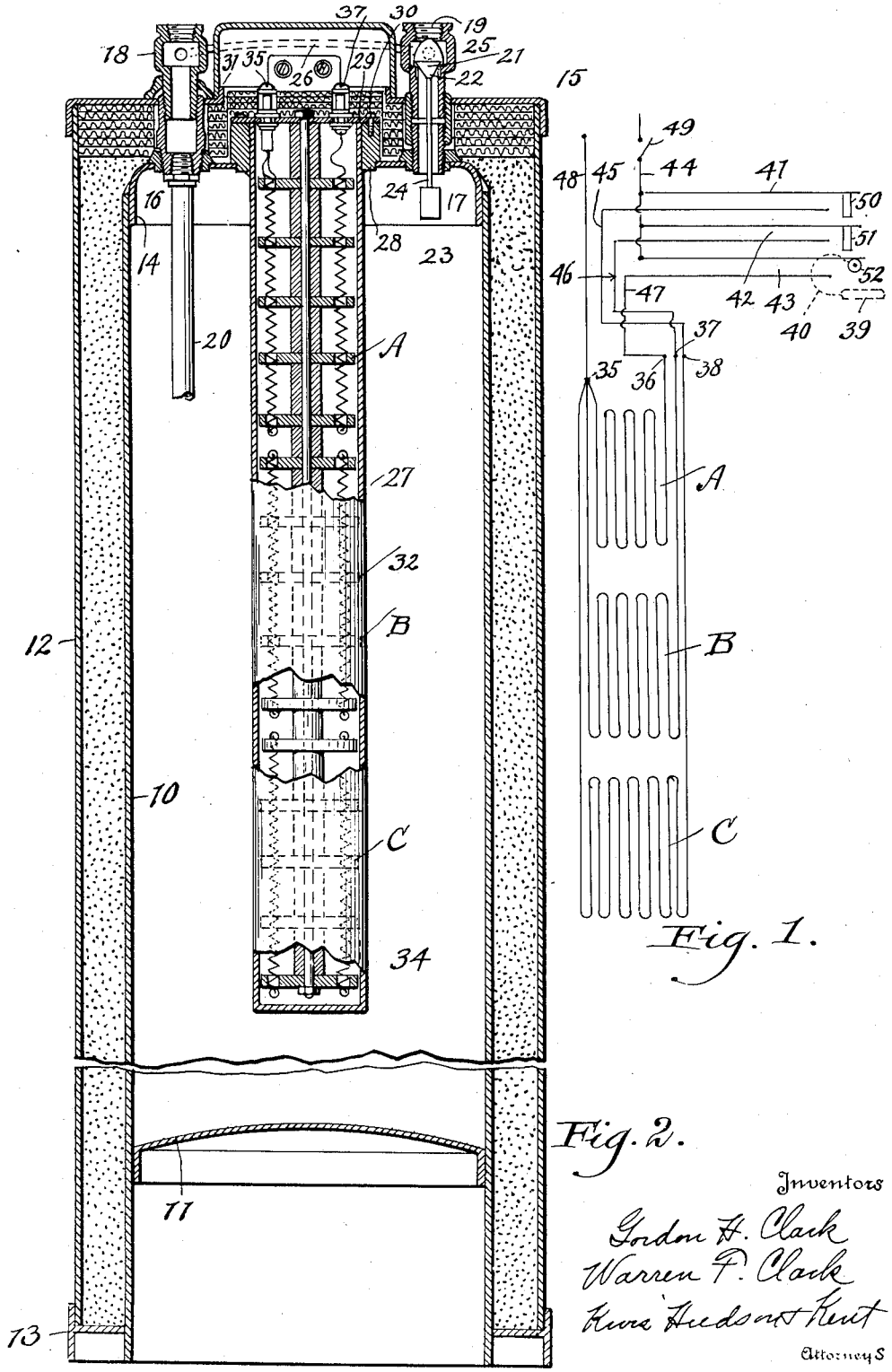
Fig. 1 is a diagrammatic wiring diagram of the circuit employed in connection with the liquid heating device.
Fig. 2 is a vertical sectional view of the liquid heating device embodying the present invention.

In the drawings a water heater is preferably shown as comprising an inner jacket 10, preferably formed of galvanized steel and adapted to contain the liquid to be heated. Near the bottom of the inner jacket 10 is a cylindrical bottom 11 electrically welded or otherwise secured to the inner surface of the jacket and preferably in the form of a stamping.

Encircling the inner jacket 10 and suitably spaced apart therefrom is an outer jacket 12, preferably of enameled steel, which has its lower end suitably secured to and supported by an annular T-shaped member 13 which latter is adapted to suitably support the water heater. Disposed between the inner jacket 10 and the outer jacket 12 is suitable insulating material, such as granulated cork, which by actual experiment has been found to best retain the heat and, furthermore, it will not deteriorate or attract vermin.

The upper end of the inner jacket 10 is provided with a cover 14 which has an annular flange adapted to cooperate with the end of the inner jacket and these members are preferably welded together, as clearly shown in Fig. 2, in such manner as to form a water tight container.

The outer jacket 12 is also provided with a cover 15, preferably of stamped steel, which is provided with an annular flange adapted to cooperate with the upper end of the outer jacket 12, the same being detachably connected thereto so that access may be afforded to the interior of the water heater.

Disposed between the cover 15 and the cover 14 of the outer and inner jackets, respectively, are a plurality of layers of air cell asbestos insulation which is adapted to suitably assist in retaining the heat within the inner jacket 10 and further functions to force the cork insulation into engagement with the inner jacket 10.

The cover 14 is provided with a pair of diagrammatically opposite openings 16 and 17, respectively, the opening 16 being adapted to receive a pipe fitting 18 which is adapted to be connected with the cold water inlet supply, while the opening 17 is adapted to receive a pipe fitting 19, which is the hot water outlet adapted to be connected with suitable conduits for transmitting the heated water to any desired place for use.

The pipe fitting 18 has connected to its lower end by screw threads or otherwise a copper pipe 20 which extends a substantial distance down into the inner jacket 10 adjacent the bottom 11, for the purpose of directing the fresh water supply as near the bottom as desirable.

The pipe fitting 19, which provides an outlet for the heated water, has a valve 21 adapted to normally engage a seat 22 upon the interior thereof and the valve 21 is normally maintained in engagement with the seat by means of a suitable weight 23 suspended from the valve by a rod 24. The heated water cannot, therefore, escape through the hot water outlet 19, due to the normally closed valve 21, and only will the valve 21 be disengaged from its seat when the hot water outlet line is opened as by the opening of a hot water faucet, at which time the heated water will raise the valve 21 from its seat and the water will be permitted to flow through the outlet opening 19. The valve 21 is limited in its upward movement by a sword or retaining member 25 which is engaged by the valve when the latter is moved upwardly by the hot water passing through the outlet 19.

It sometimes happens that there is a waste of heated water, due to leaky faucets and the like, and by controlling the flow of heated water from the inner jacket 10 by the valve 21 this objection is overcome. It is, however, advisable to provide a by-pass tube 26, as clearly shown in Fig. 2, connecting the cold water inlet fitting 18 with the hot water outlet fitting 19 above the valve seat 21 so that cold water is drawn through the by-pass tube and emitted through the leaky faucet, the weight 23 upon the valve 21 tending to retain the heated water within the inner jacket 10 and the valve only being opened to permit the passage of heated water when the faucet is fully opened.

The heating unit comprises, preferably, a seamless shell or casing 27 of suitable diameter and which is adapted to be suspended within the inner jacket 10 and to extend downwardly substantially adjacent the bottom 11. This shell 27 is adapted to extend through a galvanized steel flange 28 which is electrically welded or otherwise secured within a suitable opening in the top 14. The upper portion of the shell 27 extends through a flange 28 and is electrically welded or otherwise secured thereto, while the elctrical heating units, which will be later described in detail, are disposed within the shell 27 and supported by a flat plate 29 which extends over the flange 28 and is removably secured to the latter by means of screws 30.

The cover 15 of the outer jacket 12 is provided with a central opening surrounded by an outwardly extending lateral flange 31, the diameter of the opening being slightly larger than the diameter of the plate 29 so that if it is desired to remove the heating units from the shell 27 for repair or replacement, or other purposes, the same can be withdrawn from the top of the water heater through the opening surrounded by the flange 31 without the necessity of disconnecting the plumbing connections or even draining the tank of the water therein.

The heating unit itself is of a new and novel construction and is designed primarily for the purpose of affording a heating means for the water to be heated, which will heat the latter substantially uniformly throughout and in a relatively short period of time. The ordinary type of heating unit usually has a continuous resistance wire either encircling its support or extending longitudinally of its support throughout the entire length. Such a construction does not provide a heating unit which will heat the water substantially uniformly throughout but will rather effect an excessive heating at the upper portion of the water container while at the lower portion of the water container the temperature of the water is materially lower, due to the incoming cold water. This can be well explained by the following example wherein, if it is desired to maintain the heated water within a tank at a temperature of approximately 145°, it has been found by actual experience that the water at the lower portion of the tank where the cold water is admitted is at a temperature of about 115°, while the water at the upper portion of the tank, which is ready for discharge, has been raised to a temperature of approximately 180°. This condition very often results in an unnecessary overheating of the water tank and, furthermore, often results in damage thereto.

It is, therefore, the purpose of the present heating unit to provide a means whereby the water is heated substantially uniformly throughout by having a plurality of independent resistance elements connected in parallel and positioned one above the other and controlled by suitable means so that the water within the tank when cold is subjected to the reaction of all of the heating elements simultaneously and when the temperature of the water has been raised to a certain prior determined degree to provide for the cutting out of certain of the resistance elements and retaining the remainder of the resistance elements or element, as the case may be in operation at the location where they are most needed or in the lower portion of the tank where the cold water is being supplied thereto.

In the particular instance the resistance for the heating unit comprises a plurality of refractory porcelain insulators 32 of a diameter adapted to fit within the shell 27, as clearly shown in Fig. 2, and which insulators are spaced apart by high heat porcelain tubular insulators 33. The insulators are held in assembled relation by a nickel rod 34 which passes centrally through each of the insulators and through a central opening in the plate 29 where it is secured thereto by means of a nut or other suitable means in such manner that when the plate 29 is withdrawn the entire heating unit will likewise be withdrawn.

The heating unit is divided into independent heating elements indicated by A, B and C connected in parallel and the refractory porcelain insulators of each element are provided with openings adjacent their peripheries adapted to receive resistance wires preferably of nickel chromium adapted to operate at dull red heat so as to prevent precipitation or formation of scale on the shell 27 when the heaters are used in locations where the condition of the water is not good.

The plate 29 is provided with a suitable terminal post 35 to which one end of the resistance wires of each element are attached and other terminals 36, 37 and 38 to which the opposite end of the resistance wire of each of the elements A, B and C are respectively connected. This arrangement provides for cutting out the heating element A when the temperature of the water has been raised to a predetermined degree, and also when the temperature of the water has been raised to a higher degree to cut out the heating element B, the heating element C being sufficient and properly located at the cold water inlet to raise the temperature of the incoming water and to maintain the temperature of the water within the heater at substantially a constant predetermined degree with little difference in the temperature of the water at the top and bottom of the heater.

In operation, assuming the water in the tank to be cold, the heating elements A, B and C are operated simultaneously and heat is directly transmitted from the elements to the water in their respective regions until the temperature of the water at a certain location has reached approximately 110° F. brought about by diffusion of the heated water. The element A is then cut out and the elements B and C operate to transmit heat directly to the water in their respective regions until a higher temperature of approximately 120° F. is reached at a certain location which is brought about by diffusion of the water being heated. The element B is then cut out and the element C continues to operate until the water at a certain location has been heated to a predetermined temperature of approximately 145° F. or any other desired temperature, again brought about by diffusion of the heated water. The element C is then cut out and, as the temperature of the water varies with respect to the predetermined desired temperature, the element C is intermittently operated so as to maintain the water at the desired temperature.

The control is preferably accomplished by a thermostat, such as shown in Fig. 1, the thermostat, however, being diagrammatic and any other suitable means of controlling the heating unit may be employed in place thereof.

The thermostat is indicated by 39 and is adapted to be supported by the inner jacket 10, the thermostat extending into contact with the water within the jacket. Associated with the thermostat is preferably a Bourdon tube adapted to be affected by the changes in temperature of the water, an increase of the temperature causing the Bourdon tube to expand while a decrease in temperature causes the tube to contract. In Fig. 1 there has been indicated three switches 41, 42 and 43, corresponding, of course, to the number of heating elements which it is desired to employ. One side of the switches is connected by wire 44 to one side of the main line, while the other side of each switch is connected, respectively, by wires 45, 46 and 47 to the terminals 38, 37 and 36, respectively, or the heating elements A, B and C. The terminal 35 of the heating elements is connected by a wire 48 to the other side of the main line. A suitable switch 49 is electrically connected with one of the wires leading to the main line, preferably at 44, so as to manually control the current supply to the heating elements through the switches.

The free ends of the switches 41 and 42 are provided with depending extensions 50 and 51, respectively, while the free end of the switch 43 is adapted to cooperate with a roller 52 carried by the free end of the Bourdon tube 40. It will, therefore, be apparent that when the temperature of the water within the heater rises to a certain degree it will affect the Bourdon tube thus causing the latter to expand. This expansion in turn breaks the contact in the switch 43 and cuts out the heating element A. When the temperature of the water within the heater rises to a higher degree the Bourdon tube 40 will naturally expand a greater distance and this in turn causes the free end of the switch 43 to cooperate with the extension 51 of the switch 42 and thereby break the circuit by disengaging the points of the switch 42 which results in cutting out the heating element B. When the temperature of the water within the heater rises to a still higher degree further expansion of the Bourdon tube causes the free end of the switch 42 to abut with the extension 50 on the switch 41 and thereby break the circuit to the heating element C. When the temperature of the water drops to a point below that predeterminately desired and for which the thermostat has been set, the Bourdon tube will contract thus permitting the switch 41 to again make contact and throw into operation the heating element C. It should be understood that instead of employing a single thermostat, a plurality may be used to accomplish the same result.

The temperature of the water within the heater may be raised to any predetermined degree by setting the indicator 53, as shown in Fig. 3, in the desired position which adjusts the position of the roller 52 on the Bourdon tube 40 with respect to the switch 43, so that the said switch is opened when the water within the heater reaches the desired temperature. The thermostatic indicator is enclosed by a cover member 54 which cooperates with a stamping 55 secured within a suitable opening in the outer jacket 12 and may have its back wall welded or otherwise secured to the inner packet 10. The cover 54 is provided with an opening 56 so that access may be had to the switch 49 without the necessity of removing the cover 54.

The wires from the terminals of the heating unit are connected to the switch and thermostat by means of a conduit 57 which is secured to the stamping 55 and extends through the cork insulation between the inner and outer jackets.

The wires from the incoming line, which supply the current for the heating unit, may be attached to terminals 58 supported upon a U-shaped insulating member 59 secured to the top surface of the air cell insulation or within the opening between the annular flange 31. A cover 60, preferably in the form of a sheet metal stamping, is adapted to cooperate with the annular flange 31 on the cover 15 so as to entirely enclose the terminals and thereby prevent any injury thereto.

In order to determine the temperature of the water within the heater there is provided a temperature responsive device 61 supported by the cover 15 of the outer jacket 12 and extending downwardly within a socket 62 suitably supported in the top of the cover 14, as by a tapped sleeve 63.

While we have described the preferred embodiment of the invention, it is to be understood that we are not to be limited to the precise structure and arrangement of elements as herein illustrated but that various changes may be made without departing from the spirit of the invention as defined in the appended claims.

Having thus described our invention, what we claim is:

1. An electrical heating device comprising a plurality of heating elements adapted to heat respective regions, and means for rendering said elements operative for a predetermined period to bring the region of each element to a different temperature and for subsequently rendering said elements inoperative successively as predetermined temperature conditions are attained in the respective regions.

2. An electrical heating device comprising a plurality of heating elements adapted to heat respective regions, and means for rendering said elements operative for a predetermined period and for subsequently rendering said elements inoperative successively, the last of said elements being independently operable by said means to attain a predetermined temperature condition in its respective region.

3. An electrical heating device comprising a plurality of heating elements adapted to heat respective quantities of fluid, means for rendering said elements operative simultaneously to bring the region of each element to a predetermined temperature and for rendering said elements inoperative successively as said predetermined temperatures are attained in the respective quantities of fluid.

4. An electrical heating device comprising a plurality of heating elements arranged at different levels and adapted to heat respective regions, and means for rendering said elements operative simultaneously to raise the temperatures of each region a predetermined degree and for rendering said elements inoperative successively beginning with the uppermost element when predetermined temperature conditions are attained in the respective regions, the lowermost element being adapted to be rendered inoperative and operative automatically by said means upon variation in temperature conditions in its respective region.

5. An electrical heating device comprising a plurality of heating elements arranged in axial alignment and connected in parallel, and means for controlling the operation of said elements whereby all of said elements may be operated simultaneously for a predetermined period and subsequently each of said elements rendered inoperative successively at predetermined periods.

6. An electrical heating device comprising a plurality of heating elements arranged in axial alignment, and automatic means for controlling the operation of said elements whereby said elements are operated simultaneously for a predetermined period, and subsequently rendered inoperative successively at predetermined intervals, one of said elements being intermittently operated.

7. An electrical heating device comprising a plurality of heating elements adapted to heat respective regions, and thermostatically controlled means for rendering said elements operative to bring the respective regions to predetermined temperatures and for rendering said elements inoperative successively as said predetermined temperature conditions are attained in the respective regions.

8. An electrical heating device comprising a plurality of heating elements, and thermostatically controlled means for controlling the operation of said elements whereby at a predetermined temperature said elements are all brought into operation simultaneously for a predetermined time, and subsequently said elements are rendered inoperative successively as predetermined temperatures are reached, one of said elements being intermittently operated to maintain a predetermined temperature.

9. In a liquid heater, a liquid receptacle having an inlet and an outlet, an electrical heating unit disposed longitudinally of said receptacle comprising a plurality of heating elements, and means for rendering said elements operative simultaneously to raise the temperature of liquid at a particular level in the receptacle to a predetermined temperature and for subsequently rendering said elements inoperative successively when said predetermined temperature is reached by said liquid at said level.

10. In a liquid heater, a liquid receptacle having an inlet and an outlet, an electrical heating unit disposed longitudinally of said receptacle and comprising a plurality of heating elements arranged therein, and means for controlling the operation of said elements whereby all of said elements are brought into operation simultaneously to heat the liquid to a predetermined temperature, and subsequently rendering said elements inoperative successively as predetermined temperatures are reached, the last of said elements being intermittently operated to thereby maintain the liquid at any predetermined temperature.

11. In a liquid heater, a receptacle, a multi-element heating unit, the elements of said unit being positioned at various liquid levels, means for rendering said elements operative to raise the temperatures of the liquid in the receptacle and to render said elements inoperative successively as predetermined temperature conditions in the receptacle are attained.

12. In a liquid heater, a multi-element electrical heating unit, said elements being positioned at various liquid levels, and means for controlling the operation of said elements whereby different predetermined temperatures of the liquid actuate said control means to thereby render said elements inoperative successively, one of said elements being operated intermittently at variations from a predetermined temperature.

13. In a liquid heater, a liquid receptacle, a heating unit suspended from the top of said receptacle, said unit comprising a plurality of superposed heating elements, and means for controlling the operation of said elements whereby all of said elements may be operated simultaneously to raise the temperature of said liquid to a predetermined degree, and subsequently each of said elements rendered inoperative when the temperature of the liquid reaches predetermined degrees.

14. In a liquid heater, a liquid receptacle, a heating unit suspended from the top of said receptacle, said unit comprising a plurality of superposed heating elements, and means for controlling the operation of said elements whereby all of said elements may be operated simultaneously to raise the temperature of said liquid to a predetermined degree, and subsequently each of said elements rendered inoperative when the temperature of the liquid reaches predetermined degrees, one of said elements being rendered operative and inoperative to maintain the temperature of the liquid at any predetermined degree.

15. In a liquid heater, a liquid receptacle having a cold liquid inlet and a separate hot liquid outlet, means for supplying cold liquid to said receptacle through said inlet, means for discharging heated liquid through said separate outlet, means connecting the cold liquid inlet to the hot liquid outlet to establish communication therebetween, and a heating unit supported in said receptacle.

16. In a liquid heater, a liquid receptacle having a cold liquid inlet and a hot liquid outlet, an automatic valve controlling said outlet and adapted to open when liquid is positively withdrawn, means for by-passing liquid from said inlet to said outlet beyond said valve, and a heating unit supported in said receptacle.

17. In a liquid heater, a liquid receptacle having a cold liquid inlet and a hot liquid outlet, means responsive to flow in a hot liquid line for preventing the passage of the hot liquid through said hot liquid outlet due to a leakage in said hot liquid line, means for by-passing liquid from said inlet to said outlet, and a heating unit supported in said receptacle.

18. An electrical heating device comprising a plurality of heating elements adapted to heat respective regions, and means for rendering a limited number of said elements operative for a period of time sufficient to raise the temperature of the surrounding regions a predetermined amount and for rendering said limited number of elements inoperative successively.

19. In an electrical heating device, a fluid receptacle, a heating unit disposed longitudinally therein, said unit including a plurality of heating elements connected in parallel and arranged in axial alignment, and means for rendering said elements operative simultaneously to raise the temperatures of the fluid in the receptacle a predetermined amount and for subsequently rendering said elements inoperative successively when predetermined higher temperatures are reached within the receptacle.

20. In an electrical heating device, a fluid receptacle, a heating unit disposed longitudinally therein, said unit including a plurality of heating elements connected in parallel and arranged in axial alignment, and means for controlling the operation of said elements whereby said elements are operated simultaneously to raise the temperature of the fluid to a predetermined degree and subsequently each of said elements rendered inoperative successively as higher predetermined degrees are reached, said elements being brought into operation successively and in the reverse order to that in which they are rendered inoperative, the number of elements brought into operation depending upon the variation of temperature from a predetermined degree.

21. In an electrical heating device, a fluid receptacle, means for introducing cold fluid to said receptacle, means by which heated fluid may be withdrawn from said receptacle, a heating unit in said receptacle including a plurality of heating elements, and means for controlling the operation of said elements whereby said elements are brought into operation simultaneously to raise the temperature of the fluid to a certain degree, said elements being rendered inoperative successively as higher degrees are reached, until the temperature of the fluid has been brought to any selected degrees at which time the heating elements are all rendered inoperative, said elements being further brought into operation successively in the reverse order as the temperature of the fluid drops to certain degrees caused by the admission of cold fluid to said receptacle.

In testimony whereof, we hereunto affix our signatures.

GORDON H. CLARK.
WARREN F. CLARK.